United States Patent Office 3,466,143
Patented Sept. 9, 1969

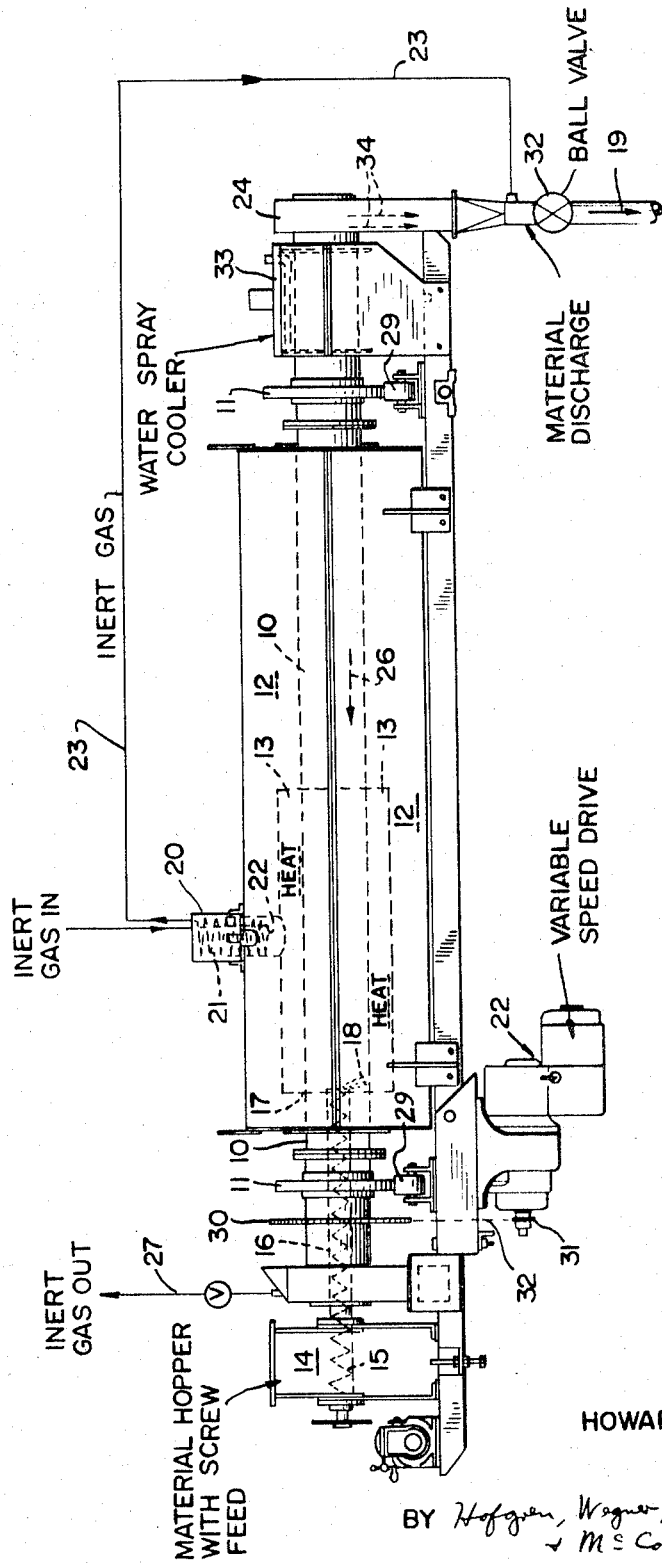

3,466,143
METHOD OF MAKING CUPROUS OXIDE
Howard E. Day, Calumet, Mich., assignor, by mesne assignments, to Calumet & Hecla Corporation, Evanston, Ill., a corporation of Delaware
Filed Apr. 13, 1967, Ser. No. 630,750
Int. Cl. C01g 3/02
U.S. Cl. 23—147                                   6 Claims

ABSTRACT OF THE DISCLOSURE

A method of producing cuprous oxide in which a mixture of copper oxides containing more than about 50% but less than all of the mixed oxides as cuprous oxide and about 0.3–1.2% ammonia is heated at about 800–1300° F. in the presence of a preheated nonoxidizing inert gas flowing at a velocity of at least about seven feet per minute until at least a significant portion of the cupric oxide in the mixture has been reduced to cuprous oxide.

---

In the present invention the particulate mixture of cupric and cuprous oxides containing the above specified amount of cuprous oxide and ammonia is heated in a nonoxidizing inert gas atmosphere at a temperature of about 800–1300° F. until at least a significant portion of the cupric oxide of the mixed oxides has been reduced to cuprous oxide. In the preferred method the mixture of oxides is from an aqueous ammonical solution copper leaching process of the type disclosed in Benedict U.S. Patent 1,131,986.

The single figure of the accompanying drawing is a semischematic elevation of an apparatus for practicing the method of this invention in a continuous manner.

In the method of this invention the raw material comprises essentially a particulate mixture of cupric and cuprous oxides in which at least about 50% but less than all of the mixed oxides is cuprous oxide and the rest is cupric oxide. The preferred amount of cuprous oxide is about 75–85% of the total. The mixture also contains ammonia in an amount of about 0.3–1.2% and an ideal raw material mixture is the product of an aqueous ammoniacal solution copper leaching process which contains the ammonia as a residue thereof.

The mixture must be freshly prepared in that it must not be more than about four weeks old before subjecting the mixture to the method of this invention. Thus, where the mixture is the product of the above-mentioned copper leaching process, the particulate mixture must have been precipitated from solution not more than about four weeks before. Although the four weeks is a maximum, actually the shorter the time period before the mixture is subjected to the process of this invention the better. Furthermore, the lower the amount of cuprous oxide in the mixed copper oxides the shorter the time delay should be before the process is practiced. Thus, where the oxides are about 79% cuprous the time delay should not be more than about 10 days. However, where the mixture is about 84% cuprous the time delay can be up to about four weeks.

In practicing the method of this invention the mixture as described above is heated in the absence of oxygen at a temperature of about 800–1300° F. with the lower temperature being used for high cuprous content feeding material while the higher temperature is used for feeds with relatively low cuprous content.

During the heating the copper oxide mixture is subjected to an inert non-oxidizing atmosphere such as one of nitrogen, carbon dioxide, mixed nitrogen and carbon dioxide and the like. During the heating of the mixture gaseous reaction products are given off and these include water, nitrogen, carbon dioxide and the like. The gas of the atmosphere is required to be inert in that it does not react with any of the components of the mixture or the products of the method of this invention.

In order that the process will be efficient the inert gas is preheated to 212° F. or above, and preferably about 250° F., in order that it may rapidly and efficiently vaporize the water that is given off as a by-product. Any substantial amount of water present causes the particulate feed material mixture to cake and can block the apparatus used in practicing the invention.

The inert gas is preferably passed in contact with the heated feed material mixture at a linear velocity that is at least seven feet per minute and preferably not less than ten feet per minute. There is no maximum limit to this linear velocity although there is no practical reason to exceed about 20 feet per minute primarily because of cost.

In one method of practicing the invention the feed mixture is brought up to a temperature of the specified 800–1300° F. range as rapidly as possible so as to prevent substantial condensation of moisture on the material. If substantial amounts of moisture should condense, the feed material tends to cake as mentioned above and block the apparatus requiring frequent shutdowns in order to remove the cake.

The 0.3–1.2% ammonia in the feed material appears to provide a gentle reducing action which reduces the cupric oxide to cuprous without producing excessive amounts of metallic copper. At the temperature of the process ammonia appears to dissociate into nitrogen and hydrogen and apparently the hydrogen present provides the reducing action. This however is merely theory and the invention is not to be limited by this theory.

The single figure of the accompanying drawing illustrates one form of apparatus for practicing the invention. In this apparatus which is actually a rotary furnace or "calciner" there is provided a rotatable elongated cylinder 10 having attached thereto a supporting collar 11 adjacent each end each supported on rollers 29. The cylinder 10 is rotated by a variable speed drive 22 operating through sprockets 30 and 31 and a chain 32.

The cylinder 10 is insulated between the collars 11 by refractory insulation 12 and the central portion of the cylinder 10 is heated either by gas fired burners (not shown) or any other desired heating means to provide an entrance and heat zone 13 surrounded by the insulation 12.

In order to feed material into the cylinder 10 within the confines of the heat zone 13 there is provided a hopper 14 for the material from which extends the helical material conveyor 15 of the usual type within the customary feed tube 16.

The inner end of the conveyor 15 and feed tube 16 extends to within the adjacent end 17 of the heat zone 13 with the result that the material is introduced as indicated at 18 into the confines of the heat zone 13. The rotating cylinder 10 which has a slope from entrance end to exit end of any degree desired (such as one inch of slope to four feet of length to one inch of slope to eight feet of length) tumbles and directs the material through the heat zone 13 to the exit end where it is discharged as indicated at 19. At the discharge the material is either packaged immediately so as to prevent substantial oxidation or is protected by a nonoxidizing atmosphere in the customary manner. The cylinder 10 at about the middle of the heat zone 13 is provided with an upwardly projecting stack 20 for the gaseous combustion by-products.

In order to provide the inert gas previously described for the reaction mixture a helical coil is arranged to extend down through the stack 20 as indicated by the lower end 22 of the coil 21. This coil which of course is the tubular conduit for the inert gas then extends back up the stack 20 and is there joined to a straight tubular conduit 23 which connects with the discharge duct 24 of the cylinder 10 at a point just above a discharge valve 32. In the length between the stack 20 and this duct 24 the conduit 23 is surrounded by heat insulation (not shown). The providing of the helical coil 21 in the stack 20 provides preheating of the inert gas prior to its introduction into the discharge end of the apparatus.

As indicated by the arrows 26 the heated inert gas flows countercurrently to the feed material 18 within the rotating cylinder 10. Thus in the apparatus of the drawing the material 18 flows from left to right while the inert gas flows from right to left. At the extreme left end of the cylinder 10 therefore the inert gas is conveyed to a place of disposal as indicated at 27. The rotation of the cylinder 10 is continuous during this flow.

As shown in the drawing the inert gas in the conduit 23 is first preheated as described in the coil 21 and then introduced into the bottom of the vertical material discharge duct 24 immediately above the discharge control valve 32. With this arrangement the product after passing through the cooler 33 is dropped vertically and loosely, as indicated by the arrows 34, through the vertical duct 24. The importance of this is that the inert gas from the conduit 23 which has been preheated as described first contacts the product 34 while it is in a loose condition so that maximum initial contact is assured. This further serves to prevent condensation of moisture on the product even though the product has just passed through the cooler 33.

As indicated above, an important requirement of the invention is to maintain the inert gas at a linear velocity of at least seven feet per minute. Such a velocity in combination with the preheating of the inert gas, as described, not only prevents caking or build-up of the product in the cooling zone 33 but also gives chemical stability to the product with both results apparently occurring because the high velocity preheated gas prevents substantial amounts of moisture forming on the product. It is this moisture which is believed to produce product instability. The fact that the product is more stable with this gas velocity and this preheating is shown by the fact that the product does not oxidize when stored in a closed container and the desired bright red color of the cuprous oxide is maintained on storage.

The accompanying table illustrates the conditions of several examples of practicing the method of this invention. In column 1 of the table there is indicated the temperature of the product that is produced by the method. Column 2 gives the r.p.m. of the cylinder 10 in each example and one particular cylinder used in practicing the invention had an internal diameter of 6½ inches and was 11 feet 2½ inches long with a variable speed of 1.39 to 13.9 r.p.m. Column 3 of the table gives the time in minutes that the material is retained within the heat zone 13, column 4 gives the loading in percent of capacity of the cylinder 10, column 5 lists the nitrogen inert gas that was used in feet per minute velocity with this nitrogen being at a temperature of 212–250° F., and column 6 lists the rate in pounds per hour that the

TABLE

| Example No. | Operation | | | | | | Mixed Oxide Feed | | | | | | | Physical | | | Product | | | | |
|---|---|---|---|---|---|---|---|---|---|---|---|---|---|---|---|---|---|---|---|---|---|
| | | | | | | | Chemical Composition | | | | | | | | | | | | | | |
| | 1 | 2 | 3 | 4 | 5 | 6 | 7 | 8 | 9 | 10 | 11 | 12 | 13 | 14 | 15 | 16 | 17 | 18 | 19 | 20 | 21 |
| | Temp., °F. | R.p.m. | Time in heat zone in mins. | Loading, percent | N₂ vel., ft./min. | Rate, lbs./hr. | TRP, percent | Copper total percent | Cu met., percent | Cu₂O, percent | CuO, percent | Oxide total | NH₃ | Ave. particle dia. | Bulk density, lbs./ft.³ | TRP, percent | Cu total percent | Cu met., percent | Cu₂O, percent | CuO, percent | Oxide total percent |
| 1 | 1,157 | 9.5 | 15.6 | 7.7 | 7.0 | 19.8 | 83.44 | 84.31 | 0.36 | 82.66 | 13.21 | 95.87 | 0.64 | 5.90 | 140.7 | 101.66 | 87.99 | 0.81 | 99.84 | | 99.84 |
| 2 | 1,150 | 9.5 | 16.3 | 8.0 | 10.0 | 19.8 | 83.44 | 84.31 | 0.36 | 82.66 | 13.21 | 95.87 | 0.64 | 5.90 | 140.7 | 105.08 | 87.85 | 3.43 | 97.36 | | 97.36 |
| 3 | 1,040 | 9.5 | 15.7 | 7.4 | 10.0 | 19.8 | 83.44 | 84.31 | 0.36 | 82.66 | 13.21 | 95.87 | 0.64 | 5.90 | 140.7 | 103.71 | 87.24 | 0.87 | 101.76 | | 101.76 |
| 4 | 1,052 | 9.5 | 15.7 | 2.6 | 7.0 | 15.8 | 83.44 | 84.31 | 0.36 | 82.66 | 13.21 | 95.87 | 0.64 | 5.90 | 140.7 | 107.84 | 87.91 | 3.23 | 100.57 | | 100+ |
| 5 | 1,153 | 8.5 | 6.5 | 1.8 | 10.0 | 15.8 | 83.79 | 82.80 | 0.36 | 83.34 | 10.75 | 94.09 | 0.64 | 5.90 | 140.7 | 107.34 | 87.04 | 1.08 | 102.88 | | 100+ |
| 6 | 1,156 | 8.5 | 8.3 | 3.5 | 10.0 | 23.7 | 83.79 | 82.80 | 0.36 | 83.34 | 10.75 | 94.09 | 0.64 | 6.80 | 157.0 | 105.21 | 87.74 | 1.17 | 102.58 | | 100+ |
| 7 | 1,144 | 8.5 | 6.6 | 3.1 | 10.0 | 23.7 | 83.79 | 82.80 | 0.36 | 83.34 | 10.75 | 94.09 | 0.64 | 6.80 | 157.0 | 107.93 | 87.87 | 2.83 | 101.34 | | 100+ |
| 8 | 1,150 | 10.5 | 6.5 | 3.4 | 10.0 | 23.7 | 83.79 | 82.80 | 0.36 | 83.34 | 10.75 | 94.09 | 0.64 | 6.80 | 157.0 | 104.36 | 87.70 | 0.36 | 103.55 | | 100+ |
| 9 | 1,150 | 10.5 | 4.7 | 2.4 | 10.0 | 23.7 | 83.79 | 82.80 | 0.20 | 83.34 | 10.75 | 94.09 | 0.51 | 6.80 | 157.0 | 107.56 | 87.98 | 0.36 | 102.10 | | 100+ |
| 10 | 1,150 | 8.5 | 7.4 | 2.8 | 10.0 | 15.8 | 83.79 | 82.80 | 0.20 | 83.34 | 10.75 | 94.09 | 0.51 | 6.80 | 157.0 | 103.02 | 88.06 | 2.22 | 98.02 | | 98.02 |
| 11 | 1,155 | 8.5 | 12.0 | 5.6 | 10.0 | 15.8 | 82.31 | 83.00 | 0.20 | 81.86 | 12.66 | 94.52 | 0.51 | 6.29 | 152.2 | 103.43 | 87.80 | 2.66 | 102.70 | | 100+ |
| 12 | 1,145 | 9.5 | 9.0 | 5.6 | 10.0 | 23.7 | 82.31 | 83.00 | 0.20 | 81.86 | 12.66 | 94.52 | 0.51 | 5.20 | 136.1 | 105.38 | 87.83 | 0.33 | 102.90 | | 100+ |
| 13 | 1,150 | 10.5 | 10.1 | 6.7 | 10.0 | 23.7 | 82.31 | 83.00 | 0.20 | 81.86 | 12.66 | 94.52 | 0.61 | 5.38 | 135.5 | 102.18 | 88.19 | 1.10 | 99.64 | 0.01 | 99.64 |
| 14 | 1,150 | 8.5 | 10.8 | 5.9 | 10.0 | 19.8 | 82.66 | 83.63 | 0.29 | 82.14 | 13.11 | 95.25 | 0.82 | 5.50 | 137.4 | 101.61 | 88.17 | 1.13 | 96.95 | 2.09 | 96.96 |
| 15 | 1,150 | 8.5 | 11.1 | 6.3 | 10.0 | 19.8 | 79.06 | 83.75 | 0.29 | 78.41 | 17.23 | 95.64 | 0.87 | 5.28 | 136.9 | 98.34 | 88.17 | 2.07 | 95.66 | 0.73 | 97.75 |
| 16 | 1,150 | 10.5 | 16.0 | 6.4 | 10.0 | 15.8 | 79.06 | 83.75 | 0.29 | 78.41 | 17.23 | 95.64 | 0.87 | 5.68 | 137.0 | 102.42 | 87.66 | 1.19 | 96.59 | | 96.37 |
| 17 | 1,150 | 8.5 | 11.1 | 7.3 | 10.0 | 23.8 | 81.38 | 84.11 | 0.31 | 80.68 | 15.22 | 95.90 | 0.86 | 5.38 | 137.8 | 99.28 | 88.12 | 1.05 | 96.92 | 1.26 | 98.18 |
| 18 | 1,100 | 10.5 | 9.7 | 5.5 | 10.0 | 23.8 | 81.38 | 84.11 | 0.31 | 80.68 | 15.22 | 95.90 | 0.86 | 5.35 | 137.1 | 97.80 | 87.80 | 0.38 | 96.58 | 2.55 | 99.13 |
| 19 | 1,100 | 8.5 | 9.0 | 5.9 | 10.0 | 19.8 | 81.38 | 84.11 | 0.31 | 80.68 | 15.22 | 95.90 | 0.77 | 5.45 | 137.1 | 101.59 | 88.28 | 0.54 | 100.01 | | 100+ |
| 20 | 1,100 | 10.5 | 11.9 | 9.1 | 10.0 | 19.8 | 77.79 | 83.82 | 0.22 | 79.29 | 16.51 | 95.80 | 0.77 | 5.42 | 137.7 | 99.26 | 88.15 | 0.70 | 95.78 | | 98.28 |
| 21 | 1,100 | 10.5 | 17.3 | 8.9 | 10.0 | 15.8 | 77.79 | 83.82 | 0.22 | 79.29 | 16.51 | 95.80 | 1.01 | 5.38 | 137.9 | 97.05 | 87.86 | 1.10 | 94.79 | 2.50 | 98.18 |
| 22 | 1,150 | 8.5 | 16.0 | 8.5 | 10.0 | 15.8 | 81.84 | 83.62 | 0.18 | 81.43 | 13.93 | 95.36 | 1.01 | 5.55 | 136.3 | 101.39 | 88.14 | 1.02 | 99.00 | 3.39 | 99.00 |
| 23 | 1,100 | 9.5 | 9.4 | 4.2 | 10.0 | 19.8 | 81.84 | 83.62 | 0.18 | 81.43 | 13.93 | 95.36 | 1.01 | 5.45 | 137.3 | 101.39 | 88.36 | 1.06 | 99.00 | | 99.00 |
| 24 | 1,150 | 10.5 | 10.0 | 6.6 | 10.0 | 15.8 | 81.84 | 83.62 | 0.18 | 81.43 | 13.93 | 95.36 | 1.01 | 5.55 | 137.3 | 100.90 | 88.36 | 1.09 | 98.45 | 2.24 | 98.45 |
| 25 | 1,160 | 9.5 | 14.6 | 6.6 | 10.0 | 15.8 | 81.84 | 83.62 | 0.18 | 81.43 | 13.93 | 95.36 | 1.01 | 5.57 | 135.1 | 98.97 | 88.27 | 1.41 | 95.80 | 2.24 | 98.04 |
| 26 | 1,150 | 9.5 | 11.9 | 5.6 | 10.0 | 15.8 | 86.25 | 83.15 | 0.21 | 85.55 | 8.73 | 94.28 | 1.10 | 4.60 | 131.2 | 109.81 | 88.64 | 7.44 | 93.06 | | 93.06 | feed material was fed through the rotating cylinder 10.

Columns 7–13 give the chemical composition of the feed material in the various examples with TRP in column 7 being the total reducing power as percent cuprous oxide, column 8 the percent of total copper in the feed material, column 9 the percent of metallic copper, column 10 the percent of cuprous oxide, column 11 the percent of cupric oxide, column 12 the total oxide content, and column 13 the percent of ammonia.

In column 14 the average particle diameter of the feed is given in microns while in column 15 is given the bulk density in pounds per cubic foot.

Columns 16–21 recite the chemical composition of the final product from the process of this invention. In column 16 the total reducing power is given while column 17 presents the total copper content, column 18 the metallic copper content, column 19 the cuprous oxide content, column 20 the cupric oxide content, and column 21 the total oxide content.

The percent cuprous oxide of column 19 is determined by subtracting 2.245 times the metallic copper percent of column 18 from the TRP percent of column 16. In many cases this number exceeds 100%. This is also true of the total oxide percent shown in column 21 and obtained by adding columns 19 and 20. The reason for this is not understood. The methods of analysis in all cases was taken from the Military Specification Pigment Grade Cuprous Oxide, MIL–P–151619A (SHIPS), including amendment 1, June 9, 1960. This specification gives detailed directions for the analytical procedures and products are accepted or rejected on the basis of these analyses.

The final product is preferably at least about 86% total copper and is preferably at least 97% total reducing power expressed as cuprous oxide. When this reducing power is expressed as cuprous oxide it can be over 100%, as shown in the table. This is true because some of the reducing power is actually due to the metallic copper present which has a higher reducing power than cuprous oxide.

The amounts presented in the table are by weight.

Having described my invention as related to the embodiments set out heerin, it is my intention that the invention be not limited by any of the details of description, unless otherwise specified, but rather be construed broadly within its spirit and scope as set out in the accompany claims.

I claim:

1. The method of producing cuprous oxide, comprising: passing through a heating zone maintained at about 800–1300° F. a freshly prepared particulate mixture containing about 0.3–1.2% ammonia and mixed cupric and cuprous oxides of which more than about 50% but less than all of said mixed oxides is cuprous oxide; and simultaneously passing a non-oxidizing inert gas preheated to a water vaporizing temperature of at least about 212° F. through said heating zone at a velocity of at least about seven feet per minute in intimate contact with the particles of said mixture, said mixture being maintained in said zone until at least a significant portion of said cupric oxide has been reduced to cuprous oxide, said amounts being by weight.

2. The method of claim 1 wherein said mixture is from an aqueous ammoniacal solution copper leaching process and contains said ammonia as a residue of said process, and said mixed oxides is about 75–85% cuprous.

3. The method of claim 1 wherein said gas is preheated to above 212° F. prior to said passing through said heating zone and is passed countercurrently to said mixture.

4. The method of claim 1 wherein said mixture is initially contacted with said gas in said heating zone in order that said mixture will rapidly reach substantially said zone temperature to prevent substantial moisture condensation from the gas on the mixture.

5. The method of claim 1 wherein said preheated gas is initially contacted with said mixture while the mixture is maintained in a loose condition.

6. The method of claim 5 wherein said loose condition is achieved by dropping said mixture vertically through a rising mass of said preheated gas.

References Cited
UNITED STATES PATENTS

| | | | |
|---|---|---|---|
| 1,131,986 | 3/1915 | Benedict | 23—147 |
| 2,758,014 | 8/1956 | Drapeau et al. | 23—147 |

FOREIGN PATENTS 163,210　5/1921　Great Britain.

OSCAR R. VERTIZ, Primary Examiner

HOKE S. MILLER, Assistant Examiner

U.S. Cl. X.R.

23—148, 279